(12) United States Patent
Senda

(10) Patent No.: US 8,107,337 B2
(45) Date of Patent: Jan. 31, 2012

(54) IMAGE PROCESSING APPARATUS AND DATA ERASING METHOD

(75) Inventor: Shigeya Senda, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 578 days.

(21) Appl. No.: 12/274,519

(22) Filed: Nov. 20, 2008

(65) Prior Publication Data

US 2009/0161513 A1    Jun. 25, 2009

(30) Foreign Application Priority Data

Dec. 20, 2007   (JP) ................. 2007-329010

(51) Int. Cl.
*G11B 5/09*   (2006.01)
(52) U.S. Cl. ............. 369/53.21; 369/53.22; 369/53.44; 369/59.23; 369/47.1; 365/185.24
(58) Field of Classification Search ............. 369/53.21, 369/53.22; 365/185.24, 185.29
See application file for complete search history.

(56) References Cited

U.S. PATENT DOCUMENTS

| | | | |
|---|---|---|---|
| 7,061,812 B2 * | 6/2006 | Shinagawa et al. ...... | 365/185.24 |
| 7,318,083 B2 | 1/2008 | Senda | |
| 2006/0070045 A1 | 3/2006 | Senda | |
| 2006/0212730 A1 | 9/2006 | Senda | |
| 2008/0141050 A1 | 6/2008 | Senda | |

FOREIGN PATENT DOCUMENTS

| | | |
|---|---|---|
| JP | 2005-107856 A | 4/2005 |
| JP | 2006-128939 | 5/2006 |
| JP | 2006-262402 | 9/2006 |
| JP | 2007-72623 | 3/2007 |
| JP | 2007-102257 | 4/2007 |
| JP | 2007-265492 | 10/2007 |

OTHER PUBLICATIONS

Japanese Office Action issued Sep. 6, 2011, in Patent Application No. 2007-329010.

* cited by examiner

Primary Examiner — Muhammad N Edun
(74) Attorney, Agent, or Firm — Oblon, Spivak, McClelland, Maier & Neustadt, L.L.P.

(57) ABSTRACT

An image processing apparatus and data erasing method make it possible to unrecoverably erase encrypted data recorded in an auxiliary storage device at high speed while reducing the load put on the CPU. Upon reception of a data erase request from a data utilizing process, the data requested to be erased is registered in a predetermined storage unit. The data registered in the storage is unrecoverably erased by overwriting, and an area in the auxiliary storage device in which the erased data was stored is released after the overwriting erasure process.

10 Claims, 14 Drawing Sheets

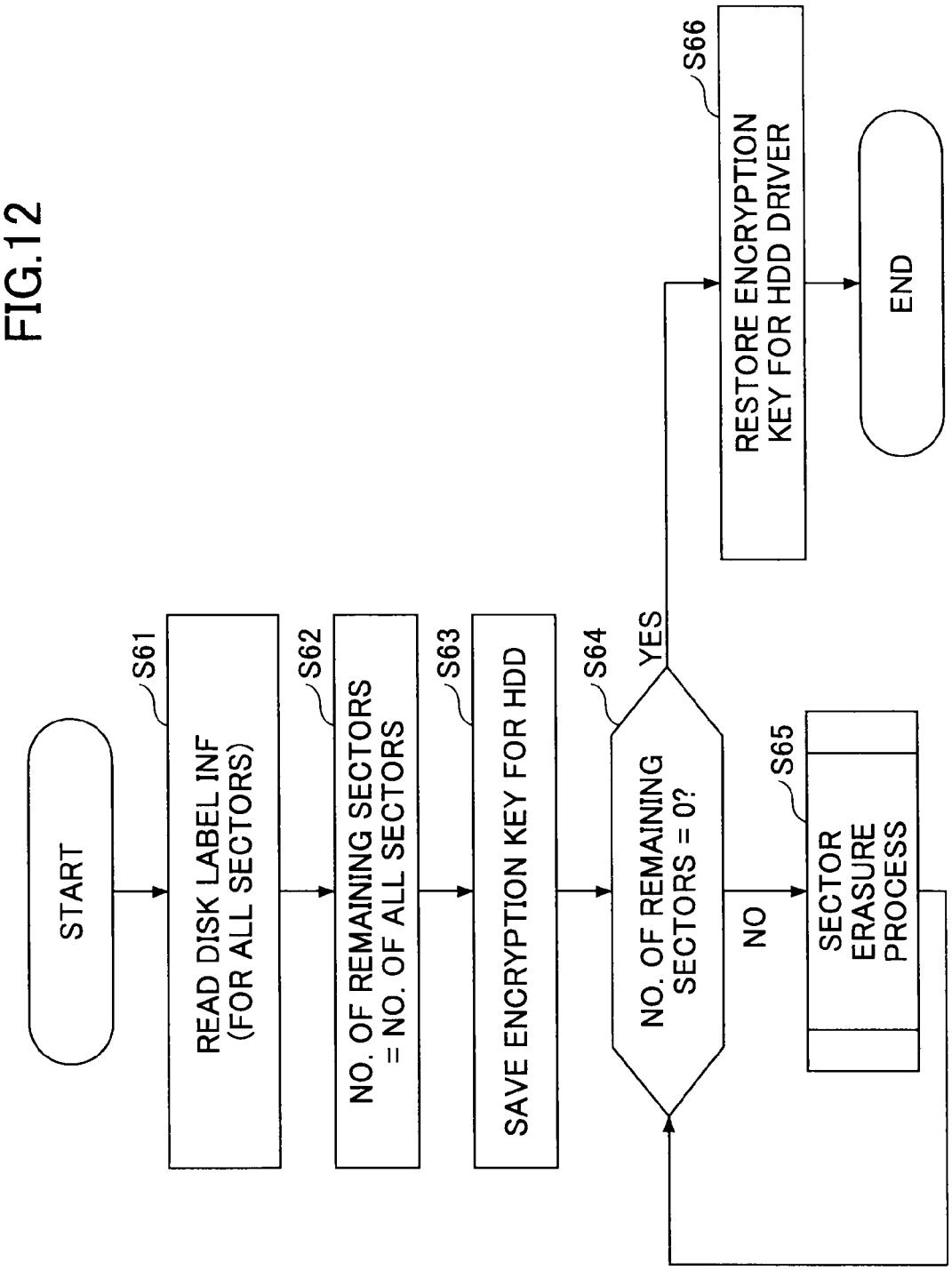

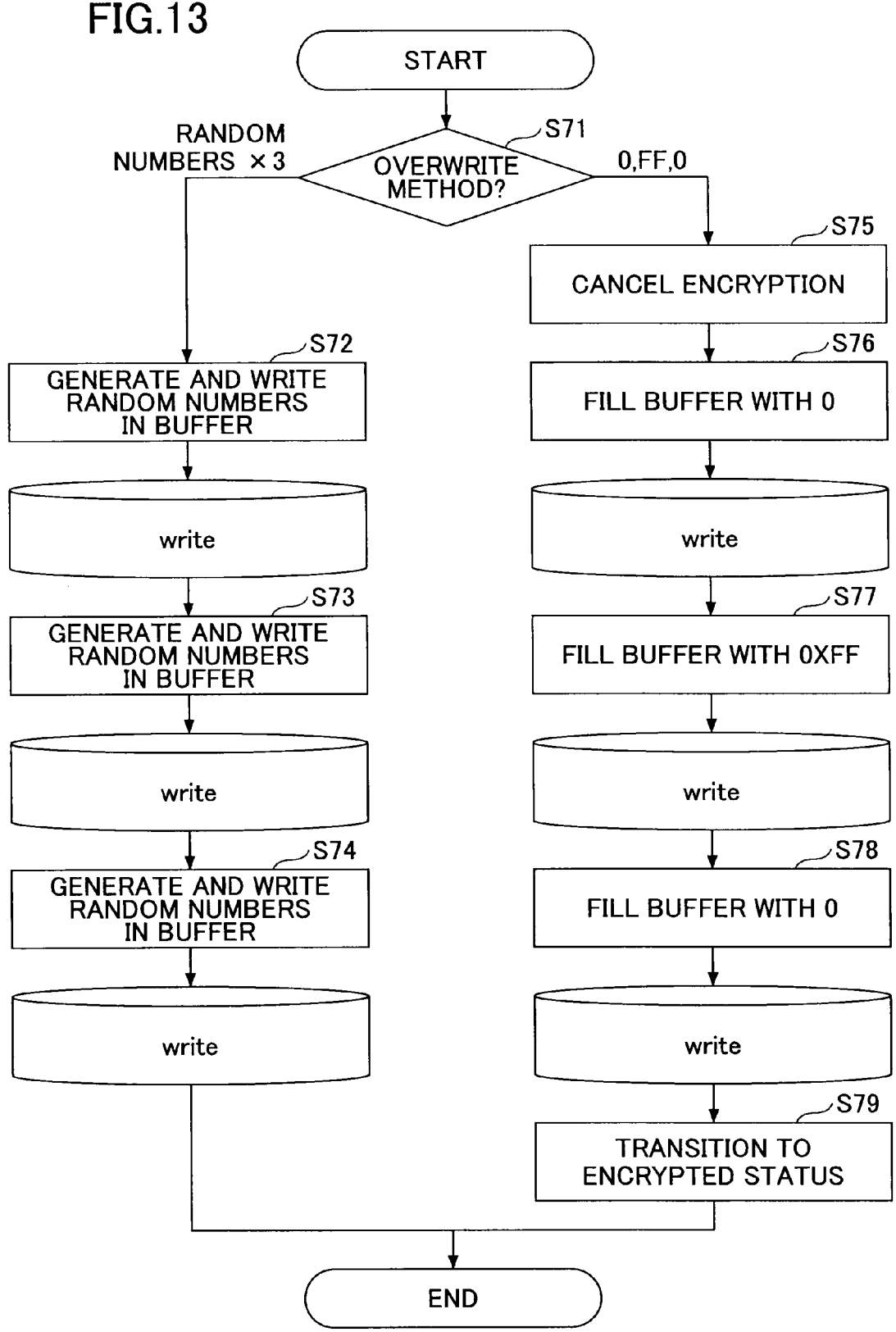

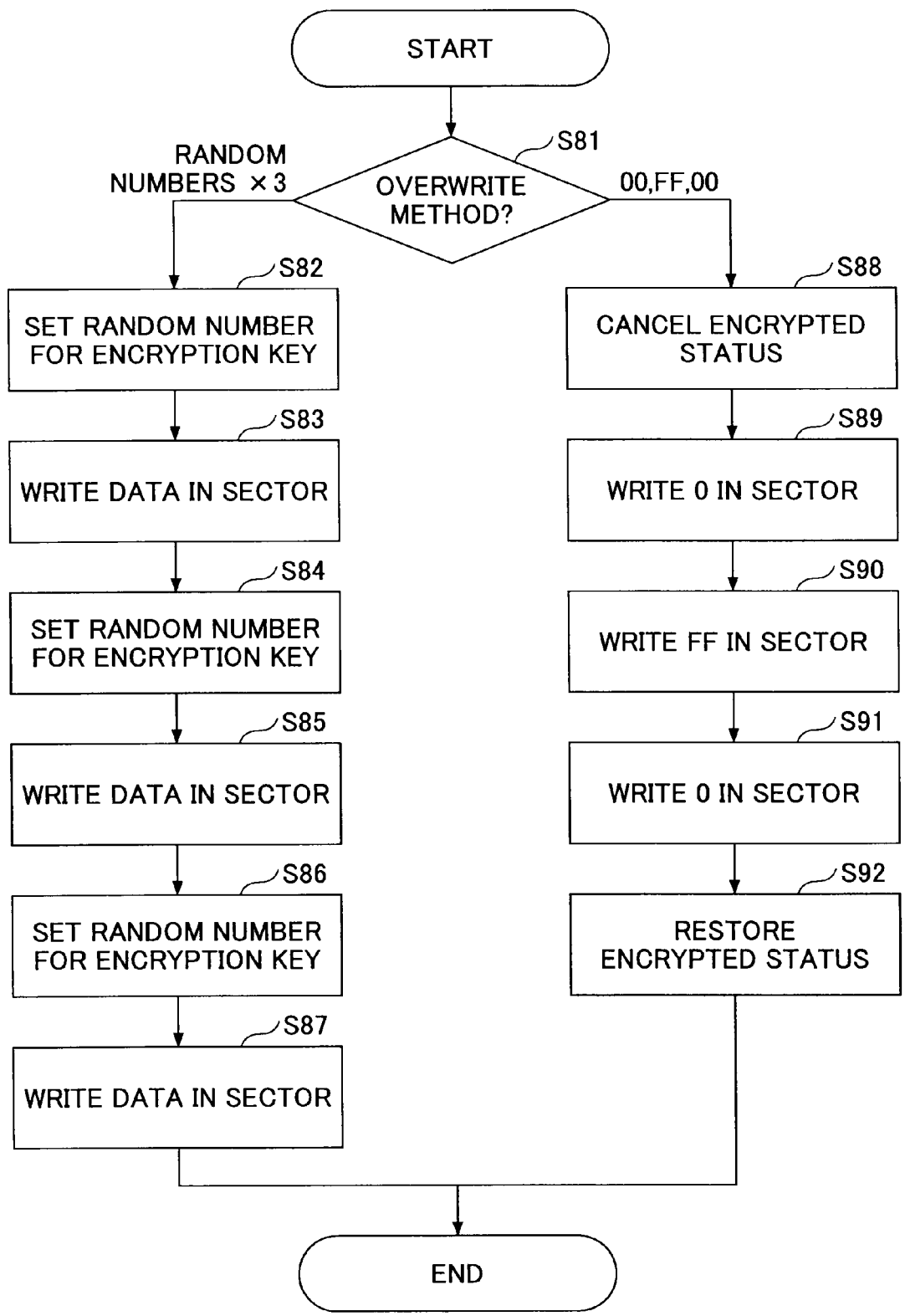

IMAGE PROCESSING APPARATUS AND DATA ERASING METHOD

BACKGROUND OF THE INVENTION

1. Field of the Invention

The present invention generally relates to image processing apparatuses and data erasing methods. Particularly, the invention relates to an image processing apparatus and data erasing method for unrecoverably erasing encrypted data recorded in an auxiliary storage device.

2. Description of the Related Art

With the increasing awareness of security issues in recent years, there is a growing need for information security management systems in offices and the like. While management of the security of information handled in personal computers (PCs) is now commonplace, there is also the need for managing the security of data handled in image processing apparatuses, such as multifunction peripherals (MFPs) in offices.

In the hard disk drive (HDD) of an MFP, system information and user information as well as image data (which may be hereafter referred to as "data and the like") are recorded. The HDD is a nonvolatile storage device that retains data even after power supply to the drive is terminated. Thus, in order to protect the data and the like recorded in the HDD from security threats, the following methods may be taken in conventional MFPs.

In a first method, the data and the like in the HDD is encrypted. In a second method, the entire contents of the HDD are destroyed when the HDD is discarded or the system is initialized. In a third method, data that has become unnecessary for the operation of the system is completely erased.

The first method, i.e., encryption of data, is often implemented by hardware in conventional MFPs, using high-speed encryption methods that are suitable for hardware implementation, such as the Advanced Encryption Standard (AES).

The second method, i.e., the destruction of the entire data (to be hereafter referred to as an "all-at-once erasure") leaves the possibility that the erased data may be recovered using an analysis tool if the erasure process is based on formatting or the like, which simply releases or makes available an area in which the erased data was stored. Thus, the data that needs to be erased is typically overwritten, as discussed in Japanese Laid-Open Patent Application No. 2006-262402.

In the third method, the data that has become unnecessary for the normal operation of the system is completely erased as soon as possible (to be hereafter referred to as "consecutive erasure"), so that the amount of remaining data that may cause a security problem can be minimized.

In the conventional MFPs, in order to completely erase data or the like by either the all-at-once erasure or consecutive erasure technique, data erasure based on formatting or the like as conventionally performed by the system is insufficient. Unless the data is overwritten a plurality of times, the data remains on the HDD. Such overwriting of data or the like puts much load on the central processing unit (CPU), thereby preventing an increase in processing speed.

SUMMARY OF THE INVENTION

It is therefore a general object of the present invention to provide an image processing apparatus and data erasing method whereby one or more of the aforementioned problems can be eliminated.

A more specific object is to provide an image processing apparatus and data erasing method whereby data or the like recorded in an auxiliary storage device can be unrecoverably erased at high speed while reducing the load put on the CPU.

According to one aspect of the present invention, an image processing apparatus for unrecoverably erasing data that is encrypted and recorded in an auxiliary storage device of the image processing apparatus comprises a detecting unit configured to detect an erasure request from a process that utilizes the data to erase the data; a registering unit configured to register the data corresponding to the erase request in a predetermined storage unit; an erasing unit configured to perform an overwriting erasure process in order to unrecoverably erase the data registered in the storage unit; and a release unit configured to release an area of the auxiliary storage device in which the data is stored, after the overwriting erasure process.

According to another aspect of the present invention, an image processing apparatus for unrecoverably erasing data encrypted and recorded in an auxiliary storage device comprises a detecting unit configured to detect an all-at-once erasure request to erase the data from a user; and an erasing unit configured to perform an overwriting erasure process in order to erase the data encrypted and recorded in the auxiliary storage device unrecoverably on a block size basis. The erasing unit performs the overwriting erasure process by causing hardware by which the data recorded in the auxiliary storage device is encrypted to generate a random number. The erasing unit unrecoverably erases the data using the random number one or more times.

According to yet another aspect of the present invention, a data erasing method for unrecoverably erasing data encrypted and recorded in an auxiliary storage device in an image processing apparatus comprises a detecting step of detecting a request from a process that utilizes the data to erase the data; a registering step of registering the data corresponding to the erase request in a predetermined storage unit of the image processing apparatus; an erasing step of performing an overwriting erasure process in order to unrecoverably erase the data registered in the storage unit; and a releasing step of releasing an area of the auxiliary storage device in which the data is stored, after the overwriting erasure process.

The present invention may be embodied in various other ways in the form of methods, apparatuses, systems, computer programs, recording media, or data structures, for example.

BRIEF DESCRIPTION OF THE DRAWINGS

These and other objects, features and advantages of the invention will be apparent to those skilled in the art from the following detailed description of the invention, when read in conjunction with the accompanying drawings in which:

FIG. 12 shows a flowchart of an overwriting erasure process sequence performed by an all-at-once erasure program;

FIG. 13 shows a flowchart of a software-based sector erasing process sequence; and FIG. 14 shows a flowchart of a hardware-based sector erasing process sequence.

DETAILED DESCRIPTION OF THE PREFERRED EMBODIMENTS

Hereafter, preferred embodiments of the present invention are described with reference to the drawings. While the embodiments are based on a multifunction peripheral (MFP) as an example of an image processing apparatus, other types of image processing apparatus or information processing apparatus may be used.

Figure 1:
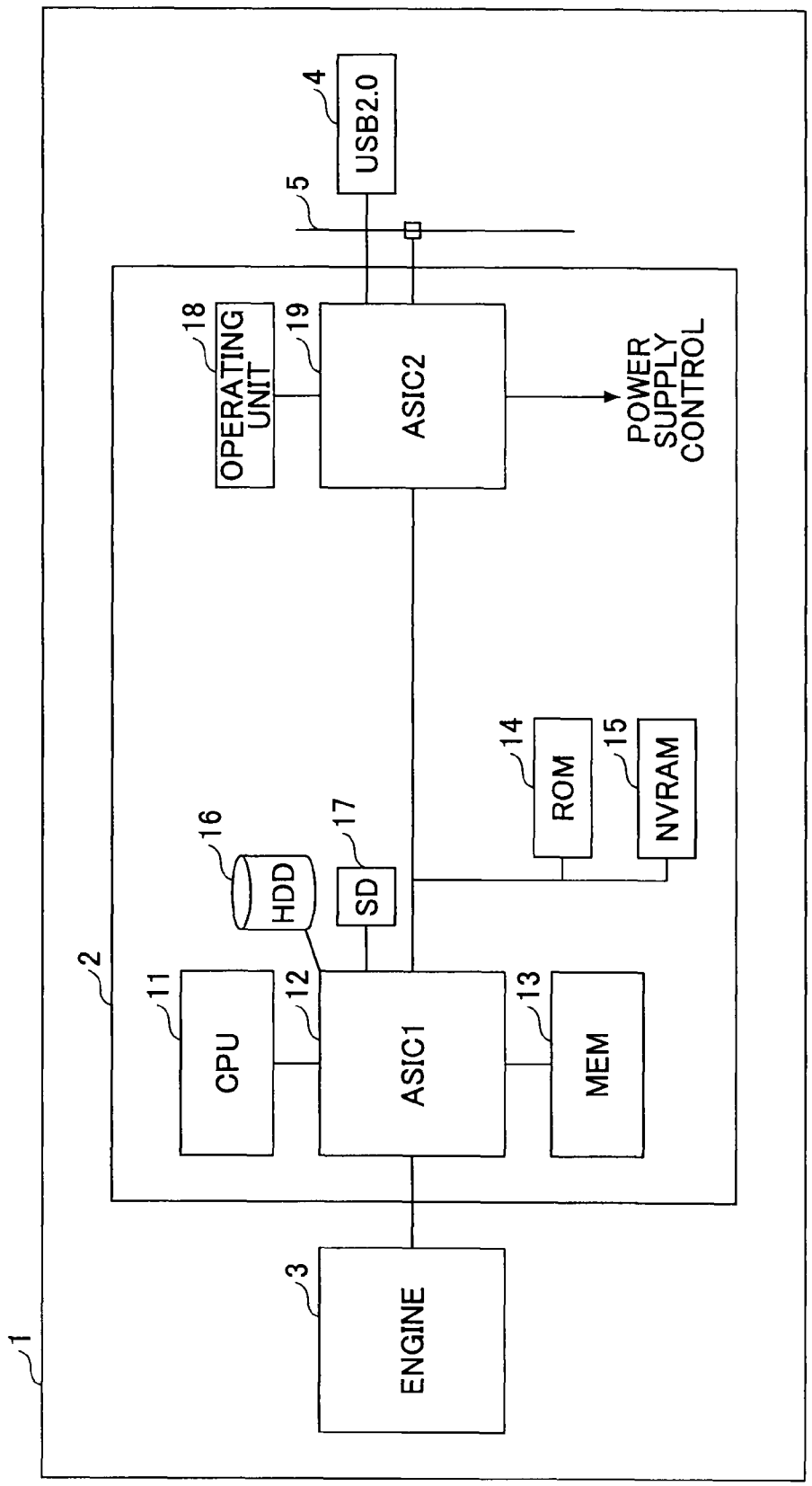
FIG. 1 shows a block diagram of a hardware structure of a MFP according to an embodiment of the invention.

FIG. 1 shows a hardware structure of an MFP 1 according to an embodiment. The MFP 1 includes a controller 2, an engine 3, a universal serial bus (USB) 2.0 interface (I/F) 4, and a network 5. The controller 2 includes a CPU 11, a first application specific integrated circuit (ASIC) 12, a memory (MEM) 13, a read-only memory (ROM) 14, a non-volatile random access memory (NVRAM) 15, an HDD 16, an SD card 17, an operating unit 18, and a second ASIC 19.

The engine 3 is connected to the first ASIC 12 of the controller 2. The USB 2.0 I/F 4 and the network 5 are connected to the second ASIC 19 of the controller 2. In the controller 2, the CPU 11 and the first ASIC 12 are connected, and the first ASIC 12 is connected to the second ASIC 19. The first ASIC 12 is connected to the memory 13, the ROM 14, the NVRAM 15, the HDD 16, and the SD card 17. The ROM 14, the NVRAM 15, and the operating unit 18 are connected to the second ASIC 19. The second ASIC 19 also performs a power supply control function.

The CPU 11, which generally controls the MFP 1, executes programs based on an operating system (OS), as will be described later. The ASIC 12 is an IC for image processing purposes. The memory 13 may be used as an image rendering memory. The ROM 14, the NVRAM 15, and the SD card 17 may be used as program memories.

The HDD 16 is an auxiliary storage device in which there may be stored image data, document data, programs, font data, forms, system information, and user information. The operating unit 18 is configured to receive input operations from an operator and to display data or information to the operator. In the hardware structure shown in FIG. 1, portions that are unnecessary for the description of the present embodiment are omitted whenever appropriate.

Figure 2:
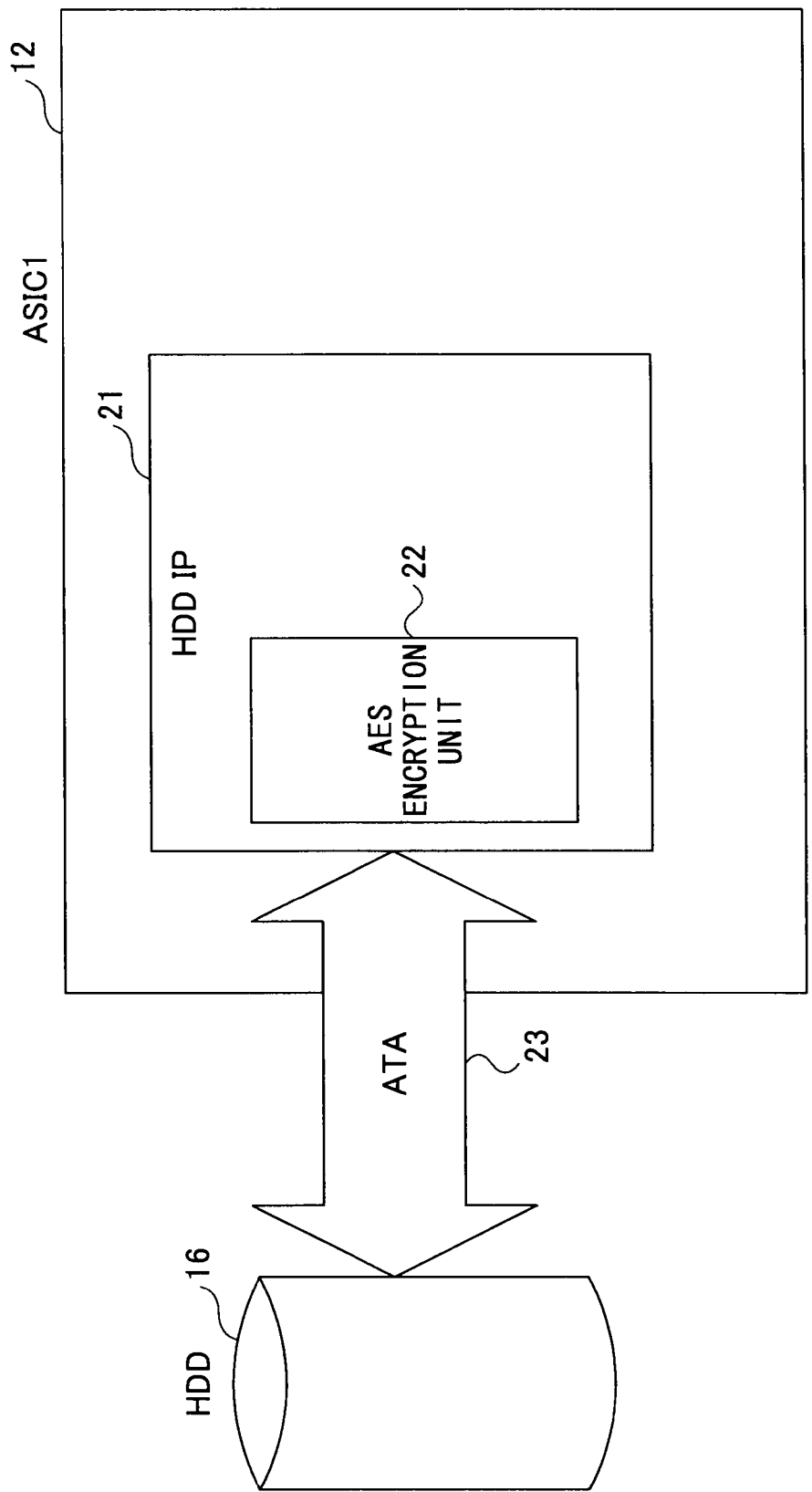
FIG. 2 shows a portion of the hardware structure of FIG. 1 where an ASIC and a HDD are connected.

With reference to FIG. 2, the portion of the structure of FIG. 1 where the first ASIC 12 and the HDD 16 are connected is described. FIG. 2 shows a diagram illustrating the connection between the ASIC 12 and the HDD 16. The first ASIC 12 includes an HDD IP (image processing) 21. The HDD IP 21 includes an AES encryption processing unit 22. The HDD 16 is connected to the HDD IP 21 of the first ASIC 12 via an AT Attachment (ATA) 23. The AES encryption processing unit 22 is provided in an output stage for the HDD 16.

As shown in FIG. 2, the encryption of data recorded in the HDD 16 is implemented by hardware (first ASIC 12). The activation/deactivation of encryption and the setting of an encryption key for the AES are controlled by software. In the MFP 1, in order to protect the data or the like recorded in the HDD 16 from security threats, a consecutive erasure or an all-at-once erasure process is performed, as described below.

Embodiment 1

Figure 3:
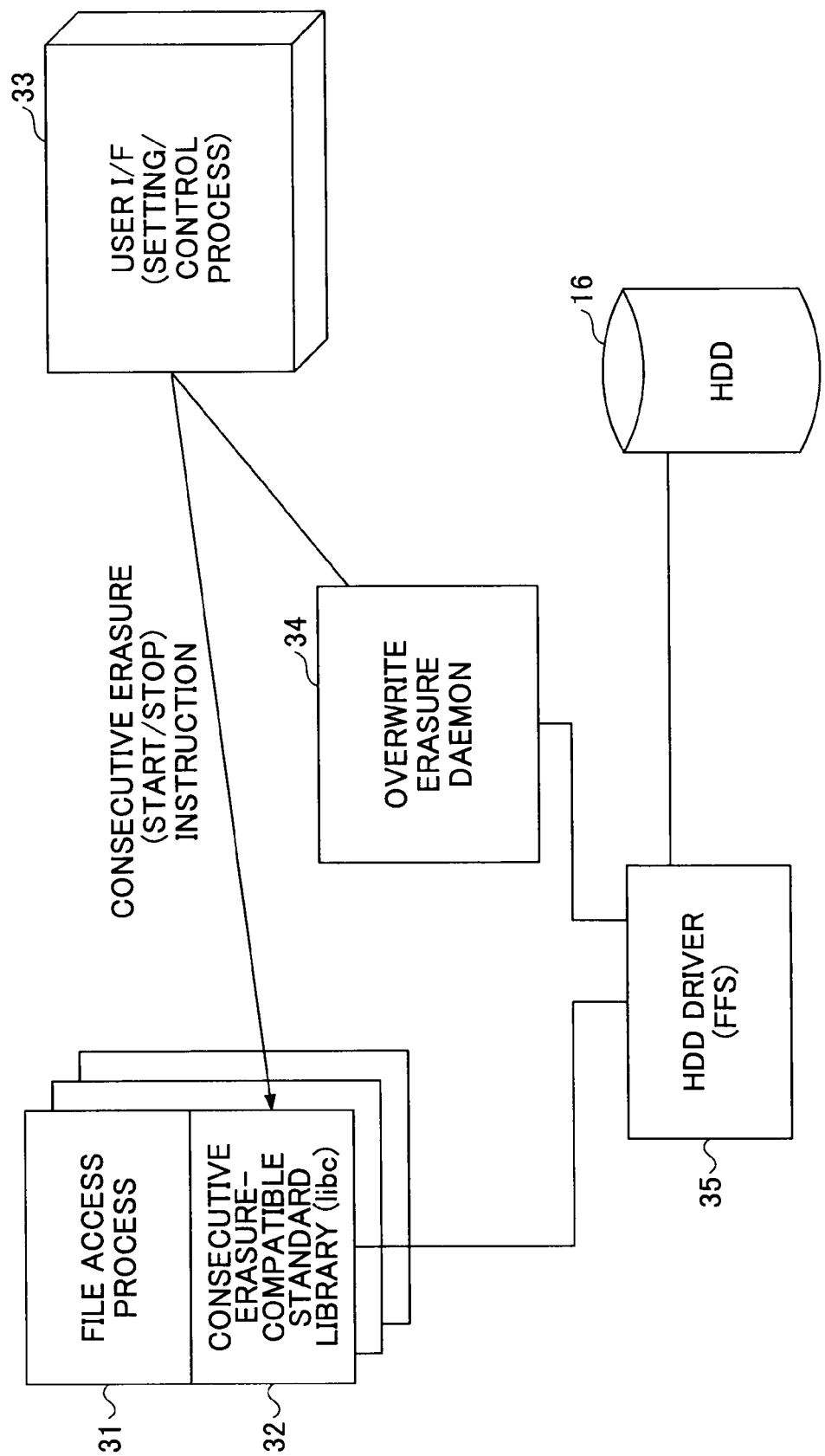
FIG. 3 illustrates an overwriting erasure process based on consecutive erasure.

FIG. 3 shows an overwriting erasure process based on consecutive erasure. In the example shown in FIG. 3, a file recorded in the HDD 16 is overwritten by consecutive erasure. In the MFP 1 shown in FIG. 3, a file access process 31 makes a request to erase the file recorded in the HDD 16 via an HDD driver (FFS) 35.

As shown in FIG. 3, in the MFP 1, in order to detect each file erase request made by the file access process 31 and execute a file overwriting erasure process reliably, a consecutive erasure-compatible reference library 32 is provided. The consecutive erasure-compatible reference library 32 is a modification of a system call/standard library (libc).

Upon detection of a file erase request via the system call/standard library, the consecutive erasure-compatible reference library 32 registers the file requested to be erased in a separate erased file storage, rather than erasing the file on the spot.

The overwriting erasure process (overwriting erasure daemon) 34 executes an overwriting erasure process on the file registered in the erased file storage, with low priority. The overwriting erasure daemon 34, after the overwriting erasure process is performed on the file registered in the erased file storage, releases the file from the file system (for actual erasure). The instruction for starting or stopping the consecutive erasure process is sent to the consecutive erasure-compatible reference library 32 and the overwriting erasure daemon 34 by the user I/F (setting/control process) 33.

Figure 4:
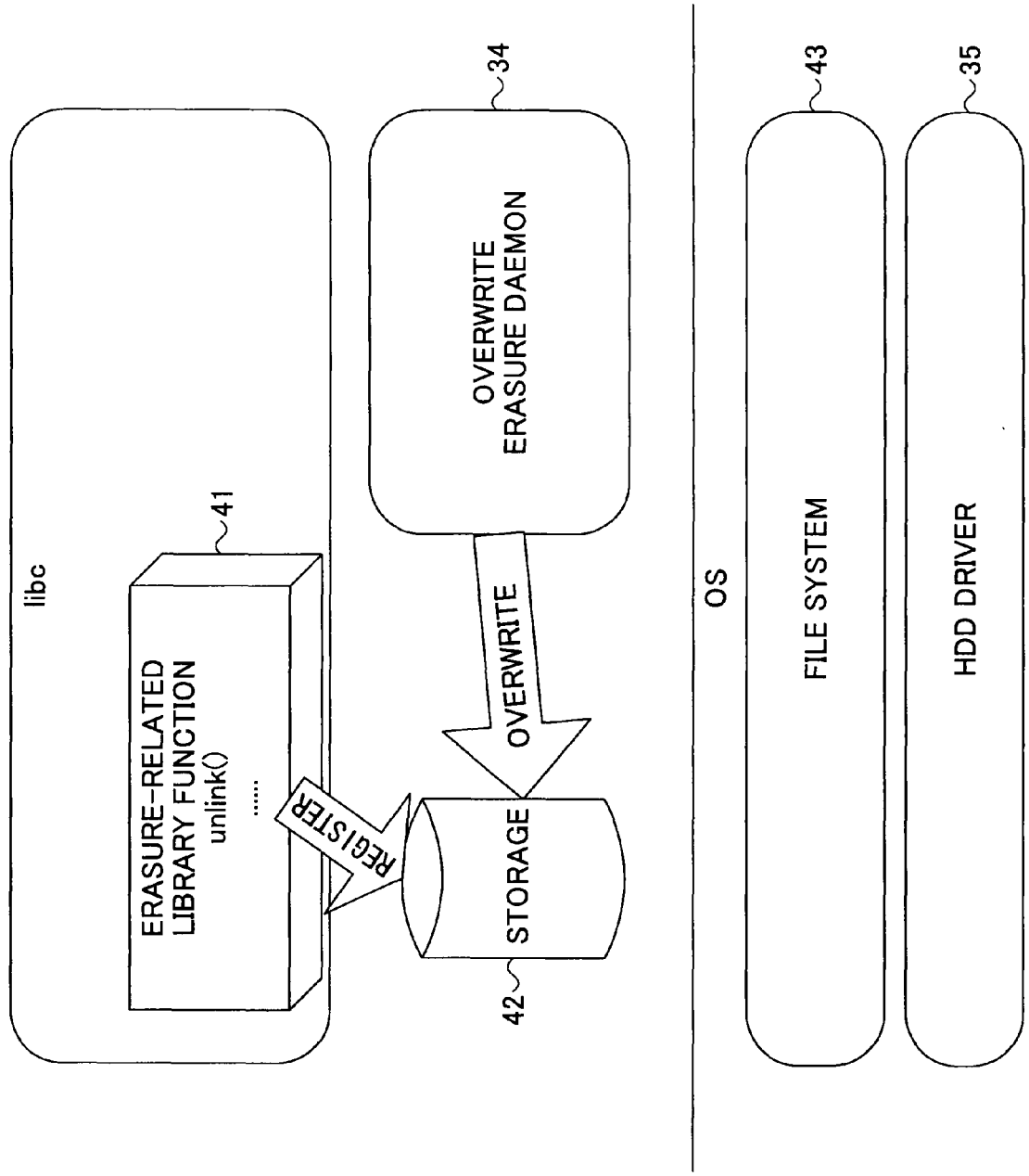
FIG. 4 shows a diagram of an overwriting erasure process performed by an overwriting erasure daemon.

FIG. 4 shows a diagram illustrating an overwriting erasure process performed by the overwriting erasure daemon. Upon detection of a file erase request via the system call/standard library, the erasure-related library function 41 in the consecutive erasure-compatible reference library 32 registers the file requested to be erased in an overwriting erasure data storage 42, rather than erasing the file on the spot.

The overwriting erasure daemon 34 then overwrites the file registered in the overwriting erasure data storage 42, with low priority. Thereafter, the overwriting erasure daemon 34 releases the file from the file system 43.

Figure 5:
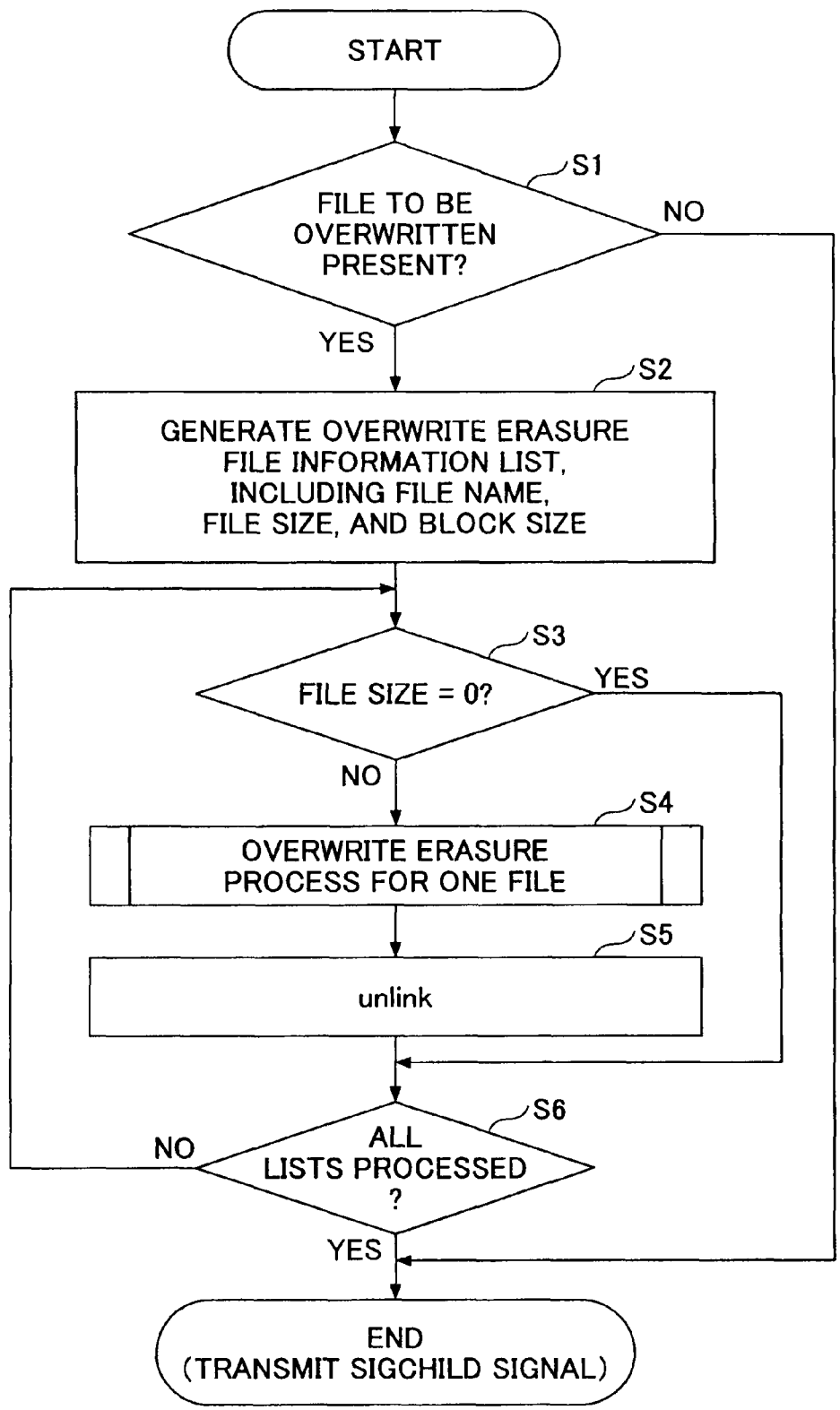
FIG. 5 shows a flowchart of an overwriting erasure process sequence performed by the overwriting erasure daemon.

The overwriting erasure process may be performed by the overwriting erasure daemon 34 as follows. FIG. 5 shows a flowchart of an overwriting erasure process sequence performed by the overwriting erasure daemon.

In step S1, the overwriting erasure daemon 34 determines whether a file is registered in the overwriting erasure data storage 42, which is an overwriting erasure directory. If not, the overwriting erasure daemon 34 ends the process of FIG. 5. If a file is registered, the overwriting erasure daemon 34 in step S2 generates as many overwriting erasure file information lists as there are the files. Each of the overwriting erasure file information lists includes a file name, a file size, and a block size.

The overwriting erasure daemon 34 successively selects one of the overwriting erasure file information lists, and repeats steps S3 through S5 the same number of times as the number of the overwriting erasure file information lists. In step S3, if the file size of the selected overwriting erasure file information list is zero, the overwriting erasure daemon 34 does not perform steps S4 and S5.

If the file size contained in the selected overwriting erasure file information list is not zero, the overwriting erasure daemon 34 in step S4 performs an overwriting erasure process for the single file using the selected overwriting erasure file information list, as will be described later. In step S5, the overwriting erasure daemon 34 eliminates the association between the selected overwriting erasure file information list and the file ("unlinking").

Figure 6:
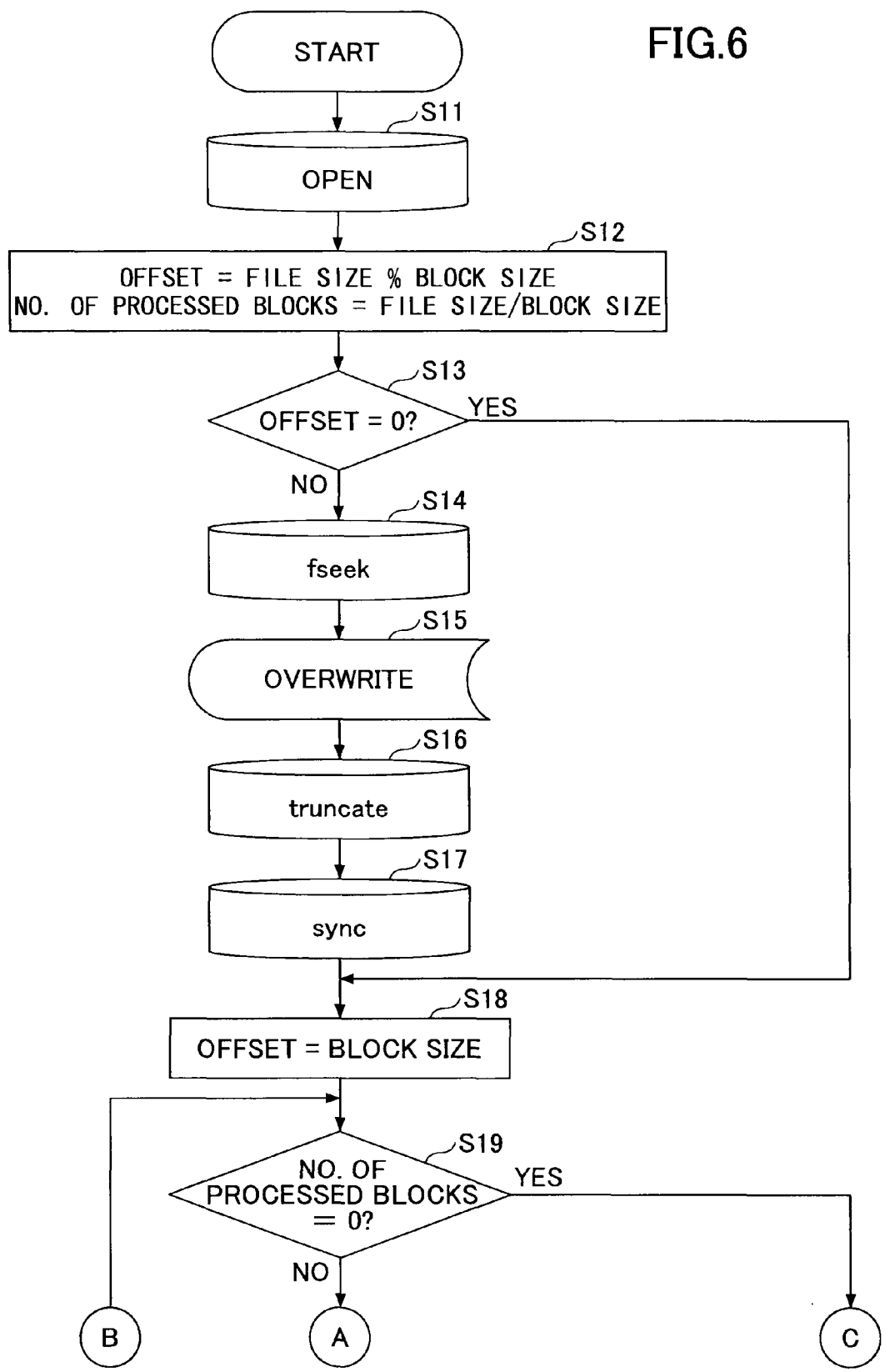
FIG. 6 shows a first half of a flowchart of an overwriting erasure process sequence for a single file.
Figure 7:
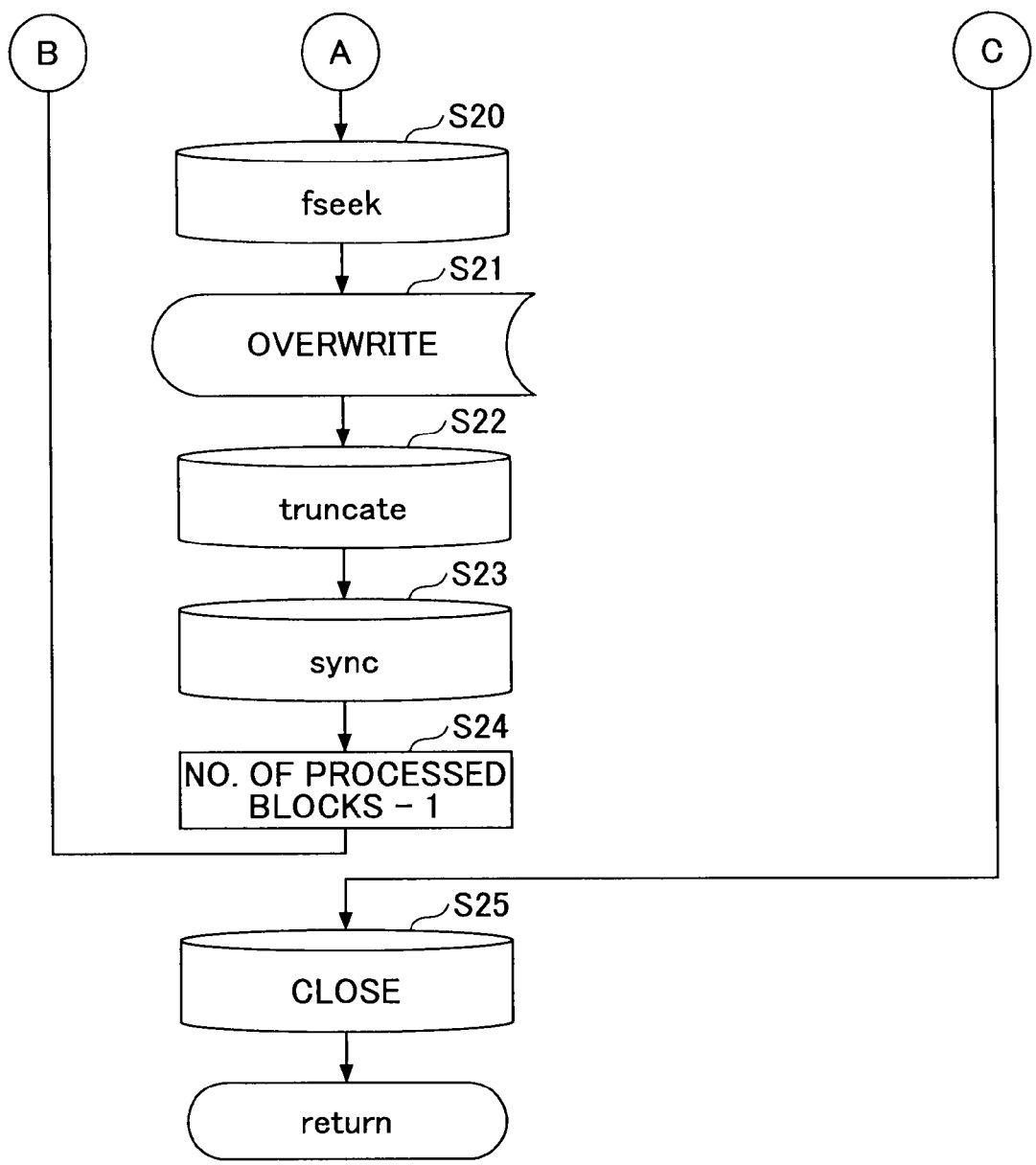
FIG. 7 shows a second half of the flowchart of FIG. 6 of the overwriting erasure process sequence for a single file.

Hereafter, the process performed in step S4 is described in detail with reference to a flowchart shown in FIGS. 6 and 7. The flowchart shows a sequence of the overwriting erasure process for a single file. In this sequence, data is erased from the rear of the file while the file is sought, thereby releasing the file.

In step S11, the overwriting erasure daemon 34 opens a file ("overwriting erasure file") in the overwriting erasure directory corresponding to the selected overwriting erasure file information list. The overwriting erasure file is assumed to be in a non block and lock mode. In the case of an error, the overwriting erasure daemon 34 returns so as to proceed to the processing of the next overwriting erasure file.

In step S12, the overwriting erasure daemon 34 calculates an offset and the number of processed blocks from the following equations (1) and (2), using the file size and the block size contained in the selected overwriting erasure file information list:

$$\text{Offset} = \text{Remainder of division of file size by block size} \quad (1)$$

$$\text{Number of processed blocks} = \text{File size}/\text{Block size} \quad (2)$$

Figure 8:
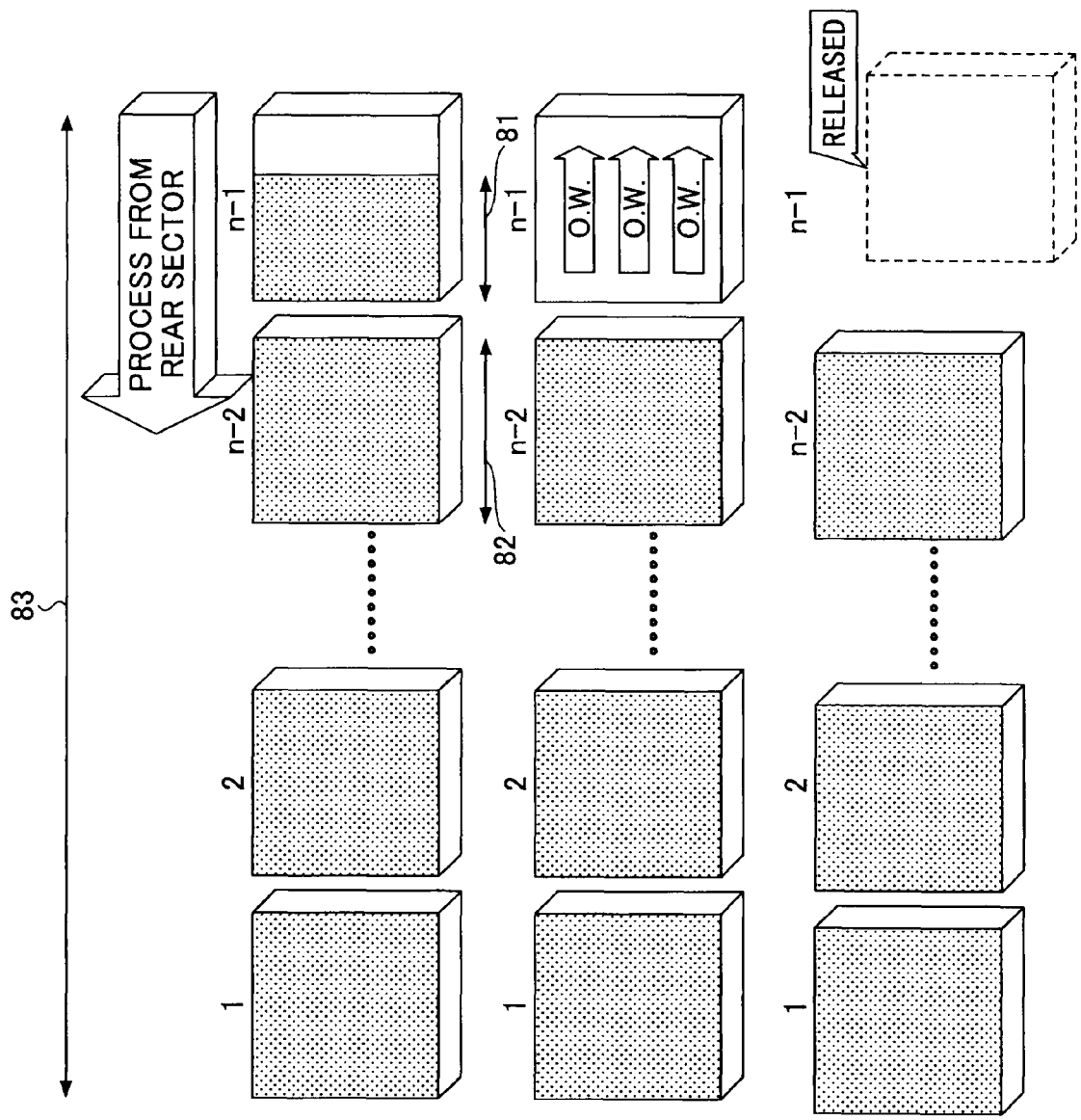
FIG. 8 conceptually shows the overwriting erasure process for a single file.

The offset, file size, and block size are described with reference to FIGS. 8A through 8C, which conceptually shows the overwriting erasure process for a single file. As shown in FIG. 8A, an offset 81 is the remainder when a file size 83 is divided by a block size 82. When the file size 83 is divisible by the block size 82, the offset 81 is zero.

In step S13, the overwriting erasure daemon 34 determines whether the offset is zero. If the offset is zero, the overwriting erasure daemon 34 proceeds to step S18 without performing steps S14 to S17. If the offset is not zero, the overwriting erasure daemon 34 in step S14 sets a pointer ahead of the rear-end of the file by the offset 81. In the example of FIG. 8A, the pointer is set at the rear-end of a block n-2.

In step S15, the overwriting erasure daemon 34 performs a below-described overwriting erasure process in order to erase the offset 81 by overwriting, as shown in FIG. 8B. In step S16, the overwriting erasure daemon 34 compacts the file size 83 by the amount of the offset 81. In step S17, the overwriting erasure daemon 34, as shown in FIG. 8C, releases the offset 81 from the file system 43, whereby the file shown in FIG. 8C is synchronized with the file recorded in the HDD 16. The routine then proceeds to step S18.

By the process through steps S12 to S17, the offset 81 is eliminated from the processed file, and the file size 83 becomes a multiple of the block size 82. In step S18, the overwriting erasure daemon 34 sets the block size as the offset.

In step S19, the overwriting erasure daemon 34 determines whether the number of processed blocks calculated in step S12 is zero. If the number of processed blocks is not zero, the overwriting erasure daemon 34 in step S20 sets a pointer ahead of the rear-end of the file by the amount of the single block size 82. Namely, with reference to FIG. 8A, the pointer moves to the rear-end of a block n-3 (not shown) from the rear-end of the block n-2.

In step S21, the overwriting erasure daemon 34 performs a below-described overwriting erasure process so as to erase the offset of the single block size 82 by overwriting. In step S22, the overwriting erasure daemon 34 compacts the file size 83 by the amount of the offset. In step S23, the overwriting erasure daemon 34 releases the block n-2 from the file system 43, whereby the file being processed is synchronized with the file recorded in the HDD 16.

In step S24, the overwriting erasure daemon 34 subtracts one from the number of the to-be-processed blocks, and then returns to step S19. Steps S19 to S24 are carried out for the number of the to-be-processed blocks calculated in step S12. After the process of steps S19 to S24 is performed for the number of the to-be-processed blocks calculated in step S12, the overwriting erasure daemon 34 proceeds from step S19 to step S25. In step S25, the overwriting erasure file opened in step S11 is closed.

Thus, the MFP 1 performs the overwriting erasure process on the file successively, starting from the block at the rear-end of the file, followed by releasing the block from the file system 43. In this way, a file with a large file size, such as an image file, can be released little by little, so that vacant areas can be provided quickly in the MFP 1. When the blocks are in the physical sector units, the overwriting erasure process can be performed in the physical sector units successively from the rear-end of the file and released from the file system 43.

Figure 9:
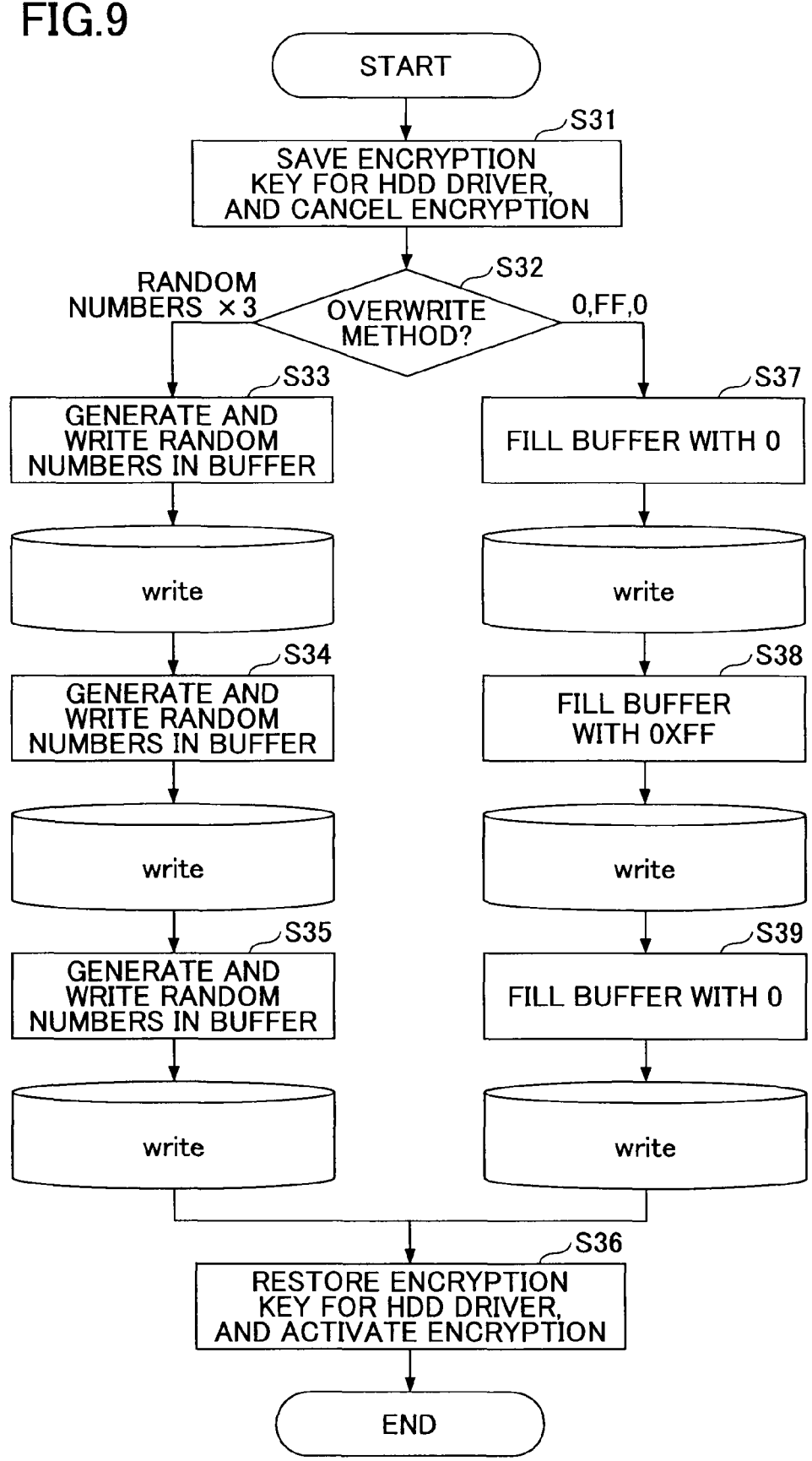
FIG. 9 shows a flowchart of a software-based overwriting erasure process sequence.

In the following, the details of the overwriting erasure process shown in steps S15 and S21 are described with reference to flowcharts shown in FIGS. 9 and 10. The flowchart of FIG. 9 corresponds to a software-based overwriting erasure process sequence. In the software-based overwriting erasure process, simply "0", "0xFF", or random numbers, for example, are written in an area of a file that is defined by an offset or block size with respect to a designated seek position (pointer position).

In step S31, the overwriting erasure daemon 34 saves an encryption key for the HDD driver 35 and then cancels encryption. In step S32, the overwriting erasure daemon 34 determines whether an overwriting erasure method that uses random numbers three times, or an overwriting erasure method that uses 0, FF, 0 should be applied.

In the case of the overwriting erasure method employing random numbers three times, the overwriting erasure daemon 34 generates random numbers in steps S33 to S35, and writes the random numbers in the buffer three times, thereby performing an overwriting erasure.

In the case of the overwriting erasure method employing 0, FF, 0, the overwriting erasure daemon 34 writes 0 throughout the buffer in step S37, writes 0xFF throughout the buffer in step S38, and then writes 0 throughout the buffer in step S39, thereby performing an overwriting erasure.

Following step S35 or S39, the overwriting erasure daemon 34 in step S36 restores the encryption key for the HDD driver 35 that has been saved in step S31, and then activates encryption.

Figure 10:
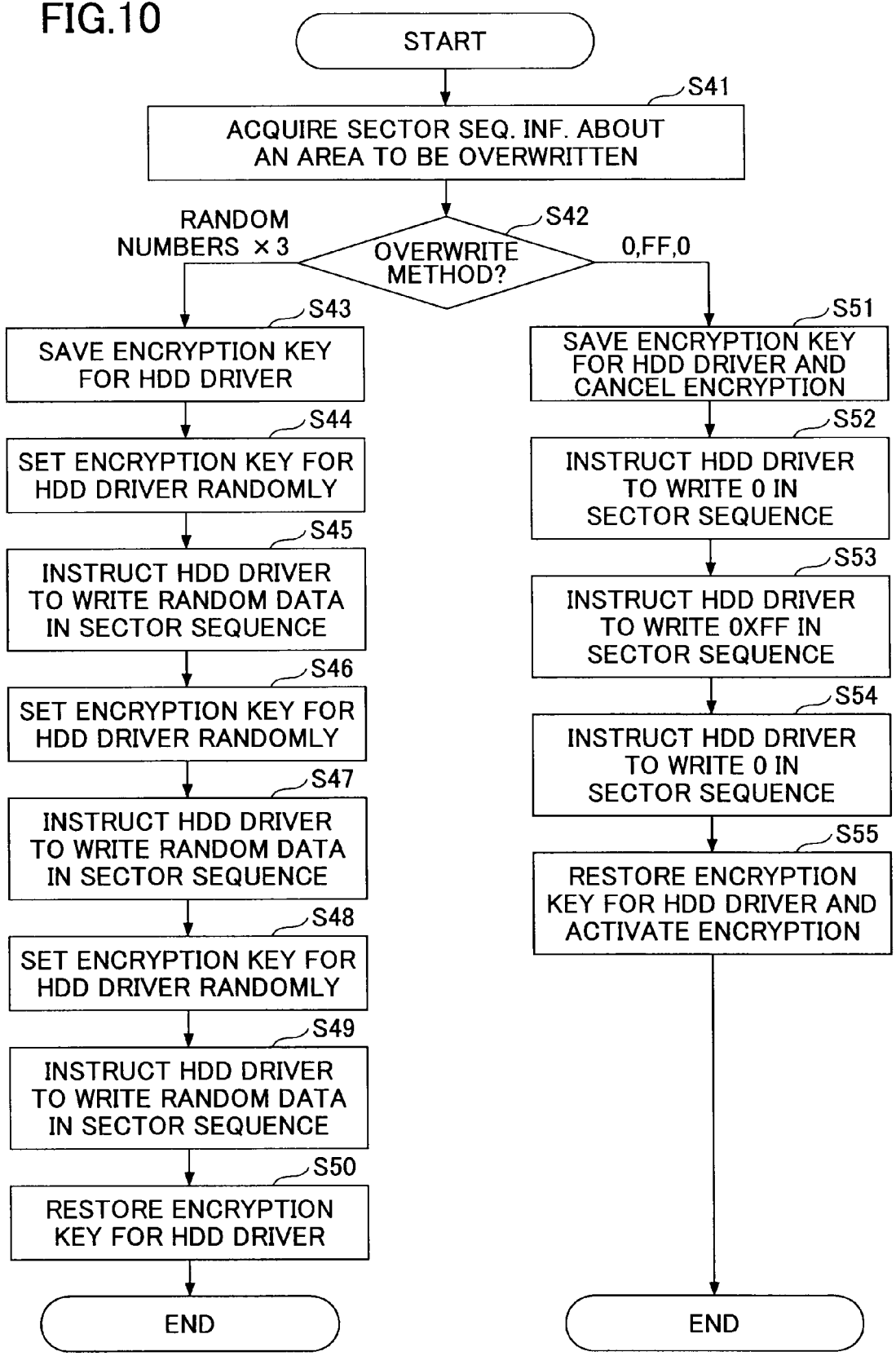
FIG. 10 shows a flowchart of a hardware-based overwriting erasure process sequence.

The flowchart shown in FIG. 10 is of a hardware-based overwriting erasure process sequence. In the hardware-based overwriting erasure process, corresponding sector information is obtained from a file, so that an overwriting erasure can be performed in the offset or sector units using a hardware Direct Memory Access (DMA).

In step S41, the overwriting erasure daemon 34 acquires sector sequence information corresponding to an area of the file that is to be overwritten. In step S42, the overwriting erasure daemon 34 determines whether the overwriting erasure method that uses random numbers three times, or the overwriting erasure method that uses 0, FF, 0 should be applied.

In the case of the overwriting erasure method that uses random numbers three times, the overwriting erasure daemon 34 in step S43 saves the encryption key for the HDD driver 35. In step S44, the overwriting erasure daemon 34 creates an encryption key for the HDD driver 35 randomly. The overwriting erasure daemon 34 in step S45 issues an instruction to the HDD driver 35 to write random data corresponding to the random key throughout the sector sequence.

In step S46, the overwriting erasure daemon 34 again creates a encryption key for the HDD driver 35 randomly. The overwriting erasure daemon 34 in step S47 issues an instruction to the HDD driver 35 to write random data corresponding to the random key throughout the sector sequence.

In step S48, the overwriting erasure daemon 34 creates an encryption key for the HDD driver 35 randomly again. The overwriting erasure daemon 34 in step S49 issues an instruction to the HDD driver 35 to write random data corresponding to the random key throughout the sector sequence. The overwriting erasure daemon 34 in step S50 restores the encryption key for the HDD driver 35 that has been saved in step S43, and ends the overwriting erasure process.

Thus, in the process in steps S43 to S50, the overwriting erasure daemon 34 creates the encryption keys randomly three times, and writes arbitrary data throughout the sector sequence three times. In this way, random numbers are written three times in a pseudo manner. Thus, the MFP 1, considering the encryption hardware as a random number generator, performs consecutive erasures, so that the CPU 11 can be subjected to less load while the speed of consecutive erasure can be increased.

In the case of the overwriting erasure method that uses 0, FF, 0, the overwriting erasure daemon 34 in step S51 saves the encryption key for the HDD driver 35 and then cancels encryption. The overwriting erasure daemon 34 in step S52 issues an instruction to the HDD driver 35 to write 0 throughout the sector sequence. The overwriting erasure daemon 34 in step S53 issues an instruction to the HDD driver 35 to write 0xFF throughout the sector sequence.

In step S54, the overwriting erasure daemon 34 issues an instruction to the HDD driver 35 to write 0 throughout the sector sequence. In step S55, the overwriting erasure daemon 34 restores the encryption key for the HDD driver 35 that has been saved in step S51, activates encryption again, and ends the overwriting erasure process.

Thus, in the process of steps S51 to S55, the overwriting erasure daemon 34 temporarily cancels encryption and then writes 0, FF, 0 throughout the sector sequence. Because the MFP 1 writes 0, FF, 0 after cancelling encryption, it can be ensured that 0 or FF is written physically at the time of degaussing.

Embodiment 2

Figure 11:
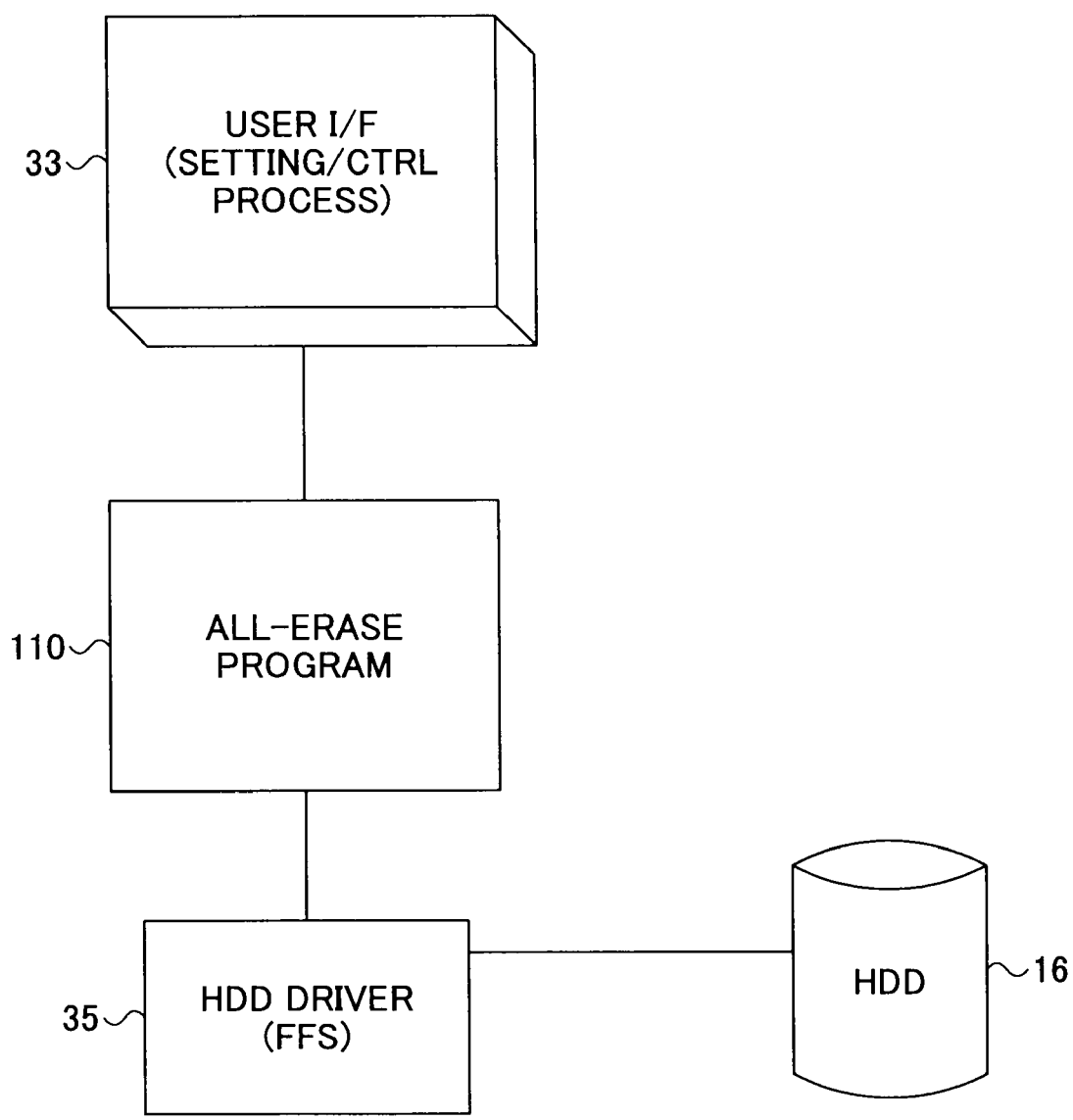
FIG. 11 shows a block diagram of an all-at-once overwriting erasure process.

FIG. 11 shows a diagram illustrating an all-at-once overwriting erasure process. The term "all-at-once" is intended to refer to the process of discarding all of the contents recorded in the HDD 16 when discarding the HDD 16 or initializing the system. As shown in FIG. 11, upon designation of the all-at-once erasure process by a user via the user I/F 33 of the MFP 1, an all-at-once erasure program 110 erases all of the contents of the HDD 16 by overwriting via an HDD driver 35, as described later.

FIG. 12 shows a flowchart of an overwriting erasure process sequence performed by the all-at-once erasure program 10. In step S61, the all-at-once erasure program 110 reads the disc label information to acquire the total number of sectors. In step S62, the all-at-once erasure program 110 sets the total number of sectors acquired in step S61 as the number of remaining sectors.

In step S63, the all-at-once erasure program 110 saves the encryption key for the HDD driver 35. In steps S64 and S65, the all-at-once erasure program 110 repeats a sector erasing process as described below until the number of remaining sectors becomes zero. When the number of remaining sectors is zero, the all-at-once erasure program 110 in step S66 restores the encryption key for the HDD driver 35 that has been saved in step S63, and then ends the overwriting erasure process. As shown in FIG. 12, in the overwriting erasure process performed by the all-at-once erasure program 110, the original encryption key is saved before the sector erasing process and then restored after the sector erasing process.

In the following, the details of the sector erasing process in step S65 are described with reference to flowcharts shown in FIGS. 13 and 14. The flowchart of FIG. 13 is of a software-based sector erasing process sequence.

In step S71, the all-at-once erasure program 110 determines whether the sector erasing method that uses random numbers three times, or the sector process method that uses 0, FF, 0 should be applied. In the case of the sector erasing method that uses random numbers three times, the all-at-once erasure program 110 in steps S72 to S74 generates random numbers and writes the generated random numbers in the buffer three times in order to erase the sectors. The sector erasing process then ends.

On the other hand, in the case of the sector process method that uses 0, FF, 0, the all-at-once erasure program 110 in step S75 cancels encryption. The all-at-once erasure program 110 writes 0 throughout the buffer in step S76, writes 0xFF throughout the buffer in step S77, and writes 0 throughout the buffer in step S78, thereby performing the sector erasure. In step S79, the all-at-once erasure program 110 activates encryption again, and ends the sector erasing process.

The flowchart of FIG. 14 is of a hardware-based sector erasing process sequence. In step S81, the all-at-once erasure program 110 determines whether the sector erasing method that employs random numbers three times, or the sector process method that employs 0, FF, 0 is to be applied.

In the case of the sector erasing method that employs random numbers three times, the all-at-once erasure program 110 in step S82 creates an encryption key for the HDD driver 35 randomly. The all-at-once erasure program 110 in step S83 issues an instruction to the HDD driver 35 to write random data corresponding to the random key throughout the sector sequence.

In step S84, the all-at-once erasure program 110 creates an encryption key for the HDD driver 35 randomly again. The all-at-once erasure program 110 in step S85 issues an instruction to the HDD driver 35 to write random data corresponding to the random key throughout the sector sequence.

In step S86, the all-at-once erasure program 110 creates an encryption key for the HDD driver 35 randomly again. The all-at-once erasure program 110 in step S87 issues an instruction to the HDD driver 35 to write random data corresponding to the random key throughout the sector sequence. After step S87, the all-at-once erasure program 110 ends the sector erasing process.

Thus, in the process of steps S82 to S87, the all-at-once erasure program 110 creates encryption keys randomly three times, and then write the corresponding arbitrary data throughout the sector sequence three times, thereby writing random numbers three times in a pseudo manner. Thus, the MFP 1 performs the all-at-once erasure process by using the encryption hardware as a random number generator, whereby the speed of the all-at-once erasure process can be increased while the CPU 11 is subjected to less load.

On the other hand, in the case of the sector process method that employs 0, FF, 0, the all-at-once erasure program 110 in step S88 cancels encryption. The all-at-once erasure program 110 in step S89 issues an instruction to the HDD driver 35 to write 0 throughout the sector sequence. The all-at-once erasure program 110 in step S90 then issues an instruction to the HDD driver 35 to write 0xFF throughout the sector sequence. In step S91, the all-at-once erasure program 110 issues an instruction to the HDD driver 35 to write 0 throughout the sector sequence. In step S92, the all-at-once erasure program 110 activates encryption again, and then ends the sector erasing process.

Thus, in the process of steps S88 to S92, the all-at-once erasure program 110 temporarily cancels encryption, and then writes 0, FF, 0 throughout the sector sequence. The writing of 0, FF, 0 after cancelling encryption by the MFP 1 can ensure that 0 or FF is physically written at the time of degaussing.

In another embodiment, a data erasing method for unrecoverably erasing data encrypted and recorded in an auxiliary storage device of an image processing apparatus comprises a detecting step of detecting an all-at-once erasure request from a user to erase the data; and an erasing step of unrecoverably erasing the data encrypted and recorded in the auxiliary storage device by overwriting on a block size basis. The erasing step includes causing hardware by which the data recorded in the auxiliary storage device is encrypted to generate a random number, and unrecoverably erasing the data using the random number one or more times.

The erasing step may include unrecoverably erasing the data using plural predetermined values one or more times after encryption of the data by the hardware is canceled.

Although the invention has been described with reference to particular examples, it will be appreciated by those skilled in the art that the invention may be embodied in many other forms.

The present application is based on the Japanese Priority Application No. 2007-329010 filed Dec. 20, 2007, the entire contents of which are hereby incorporated by reference.

What is claimed is:

1. An image processing apparatus for unrecoverably erasing data that is encrypted and recorded in an auxiliary storage device of the image processing apparatus, the apparatus comprising:
   a detecting unit configured to detect an erasure request from a process to erase the data;
   a registering unit configured to register the data corresponding to the erase request in a predetermined storage unit;
   an erasing unit configured to perform an overwriting erasure process in order to unrecoverably erase the data registered in the storage unit; and
   a release unit configured to release an area of the auxiliary storage device in which the data is stored, after the overwriting erasure process, wherein
   the erasing unit divides a file of the data into one or more blocks of a block size and an offset of less than the block size, based on a file size and the block size of the file,
   in the absence of the offset, the erasing unit performs the overwriting erasure process on the one or more blocks successively, starting from a block at a rear-end of the file, and
   in the presence of the offset, the erasing unit performs the overwriting erasure process on the one or more blocks successively, starting from the block at the rear-end of the file, after performing the overwriting erasure process on the offset.

2. The image processing apparatus according to claim 1, wherein, when the data is registered in the storage unit, the erasing unit performs the overwriting erasure process after cancelling encryption by hardware by which the data in the auxiliary storage device is encrypted.

3. The image processing apparatus according to claim 2, wherein the erasing unit causes the encrypting hardware to generate a random number by creating an encryption key randomly, the erasing unit performing the overwriting erasure process using the random number one or more times in order to unrecoverably erase the data.

4. The image processing apparatus according to claim 2, wherein the erasing unit performs the overwriting erasure process by using plural predetermined values one or more times in order to unrecoverably erase the data.

5. An image processing apparatus for unrecoverably erasing data encrypted and recorded in an auxiliary storage device, comprising:
   a detecting unit configured to detect an all-at-once erasure request to erase the data from a user; and
   an erasing unit configured to perform an overwriting erasure process in order to erase the data encrypted and recorded in the auxiliary storage device unrecoverably on a block size basis;
   wherein the erasing unit performs the overwriting erasure process by causing hardware by which the data recorded in the auxiliary storage device is encrypted to generate a random number, the erasing unit unrecoverably erasing the data by overwriting the data with the random number one or more times.

6. The image processing apparatus according to claim 5, wherein the erasing unit performs the overwriting erasure process by utilizing plural predetermined values one or more times in order to unrecoverably erase the data, after cancelling encryption of the data by the hardware.

7. A data erasing method for unrecoverably erasing data encrypted and recorded in an auxiliary storage device in an image processing apparatus, the method comprising:
   detecting a request from a process to erase the data;
   registering the data corresponding to the erase request in a predetermined storage unit of the image processing apparatus;
   performing an overwriting erasure process in order to unrecoverably erase the data registered in the storage unit; and
   releasing an area of the auxiliary storage device in which the data is stored, after the overwriting erasure process, wherein
   the performing the overwriting erasure process includes dividing a file of the data into one or more blocks of a block size and an offset of less than the block size, based on a file size and the block size of the file,
   in the absence of the offset, performing the overwriting erasure process on the one or more blocks successively, starting from a block at a rear-end of the file, and
   in the presence of the offset, performing the overwriting erasure process on the one or more blocks successively, starting from the block at the rear-end of the file, after performing the overwriting erasure process on the offset.

8. The data erasing method according to claim 7, further comprising, when the data is registered in the storage unit, performing the overwriting erasure process after cancelling encryption by hardware by which the data stored in the auxiliary storage device is encrypted.

9. The data erasing method according to claim 8, further comprising performing the overwriting erasure process by causing the encrypting hardware to generate a random number by creating an encryption key randomly, in order to unrecoverably erase the data using the random number one or more times.

10. The data erasing method according to claim 8, further comprising performing the overwriting erasure process by using plural predetermined values one or more times in order to unrecoverably erase the data.

* * * * *